Sept. 29, 1970  B. G. RODGERS  3,531,019

FOOD DISPENSING MACHINE WITH ADJUSTABLE AUGER

Filed May 1, 1968  3 Sheets-Sheet 1

INVENTOR.
BURLEY G. RODGERS

BY

ATTORNEYS

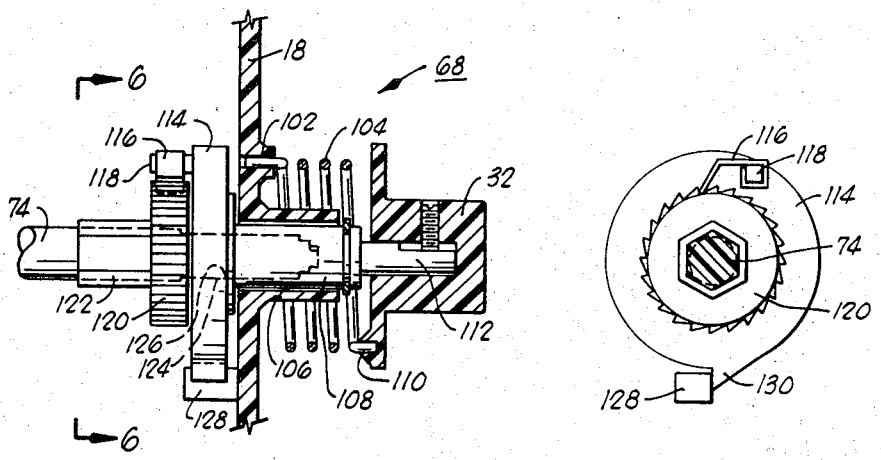
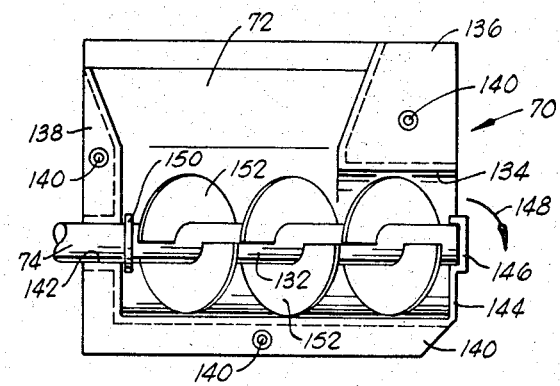
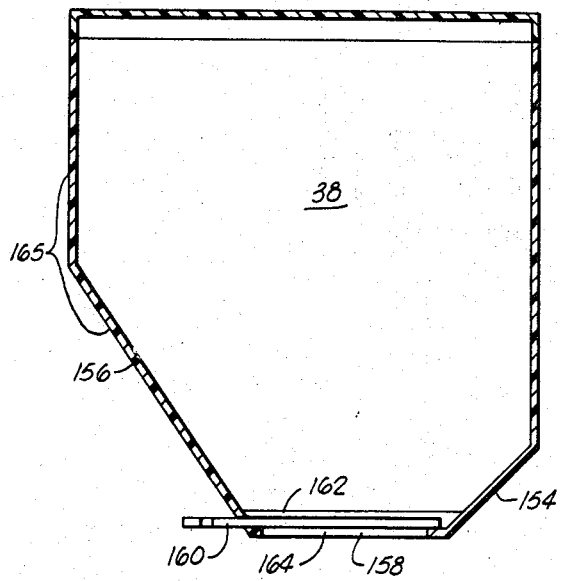
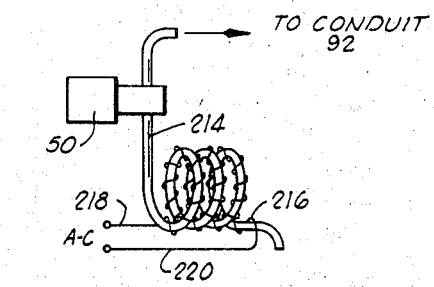

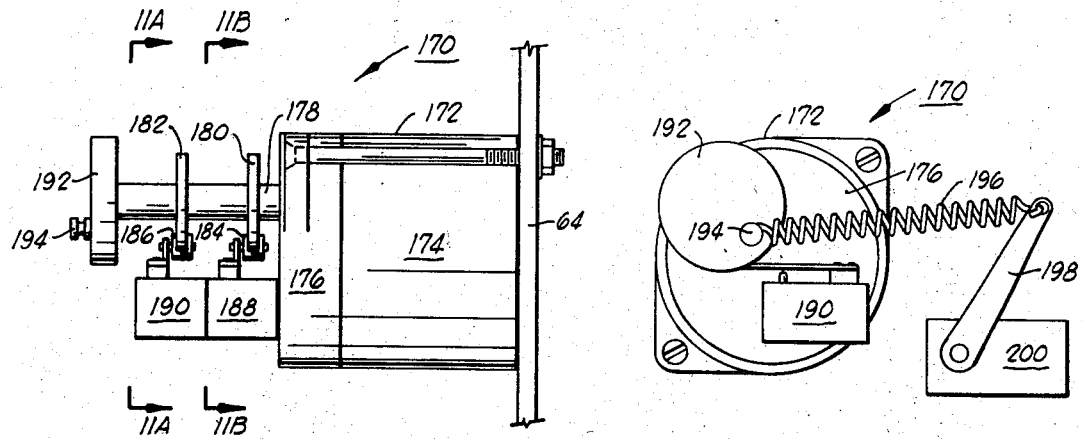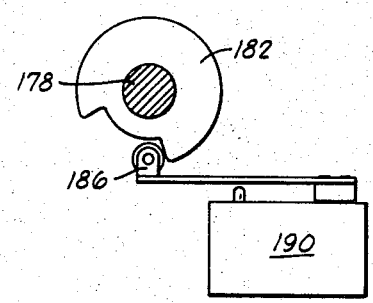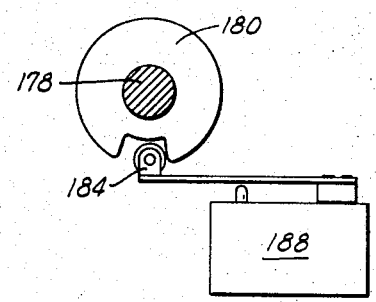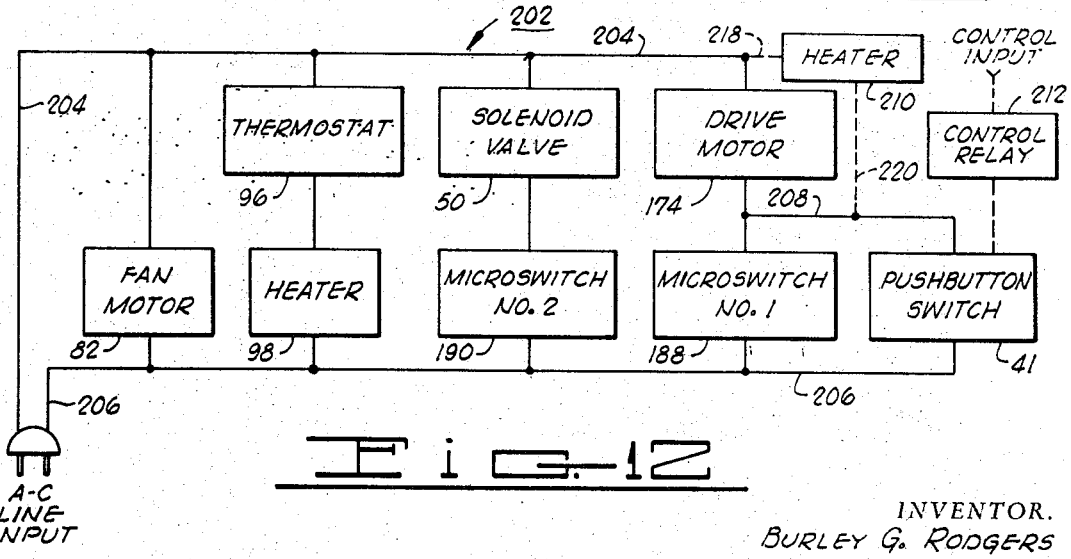

United States Patent Office 3,531,019
Patented Sept. 29, 1970

3,531,019
FOOD DISPENSING MACHINE WITH ADJUSTABLE AUGER
Burley G. Rodgers, Oklahoma City, Okla., assignor to Dispensing Systems, Inc., Oklahoma City, Okla., a corporation of Oklahoma
Filed May 1, 1968, Ser. No. 725,819
Int. Cl. B67d 5/10
U.S. Cl. 222—2
13 Claims

ABSTRACT OF THE DISCLOSURE

An apparatus for the dispensing of powdered food material for reconstitution with suitable liquid, the apparatus consisting of a vending machine type of housing which receives a plurality of canisters containing selected powdered food materials in supplying relationship to a plurality of metering assemblies which are individually controllable from the front of the housing. Selection of powdered food material is made by manipulation of selected ones of the metering assemblies to place powdered food material in a mixing section of a trough whereupon control is effected to dispense a liquid from an adjacent liquid supply into the mixing section whereupon the reconstituted food material is allowed to flow to a container for consumptive use.

BACKGROUND OF THE INVENTION

Field of the invention

The invention relates generally to food dispensing machines and, more particularly, but not by way of limitation, it relates to improved dispensing machines for providing reconstituted powdered food materials.

Description of the prior art

The prior art includes various types of vending or food dispensing machines which serves to dispense selected food materials upon initiation by some control function, usually a trigger derived from a coin acceptor mechanism. Such machines as formerly known are capable of dispensing numerous types of liquid foods, either hot or cold liquids, and these employ diverse forms of mechanism as dictated largely by the types and consistency of the raw or basic materials which are employed. Also, the machines have usually been constructed from large, heavy material since one of the primary considerations had to be internal security to guard against the various forms of piracy which occur with the vending type dispensing machine.

SUMMARY OF THE INVENTION

The present invention contemplates a food dispensing or vending machine for use by a group of people to dispense manually selected concentrations of reconstituted powdered foods. In a more limited aspect, the invention consists of a housing assembly which is adapted to receive a plurality of canisters containing different powdered food materials, e.g. dehydrated coffee, dried cream substitute, and sugar, and a plurality of individual metering assemblies for enabling manual selection of desired ones of the powdered food material for deposit into a mixing trough. Thereafter, control is initiated to dispense a predetermined amount of liquid, e.g. hot water, from a liquid supply into said mixing trough whereupon the reconstituted food material is allowed to flow to a dispensing position for deposition in a suitable container.

Therefore, it is an object of the present invention to provide a dispensing machine wherein the individual supplies of powdered food material are easily replenished by replacement of the entire supply canisters containing the various ones of the powdered food material.

It is also an object of the invention to provide a tea or coffee dispensing machine which allows variable manual selection in accordance with personally preferred concentration of all or selected ones of the tea or coffee, cream or sugar.

It is still further an object of the present invention to provide a coffee dispensing machine for use by a selected group of people as for coffee breaks or such and which is economical, light and reliable of construction, and easy to clean and care for.

Finally, it is an object of the present invention to provide a coffee dispensing machine which allows selection in accordance with personal preference and which may be constructed from known plastics and laminates while employing replaceable plastic canisters.

Other objects and advantages of the invention will be evident from the following detailed description when read in conjunction with the accompanying drawings which illustrate the invention.

BRIEF DESCRIPTION OF THE DRAWINGS

FIG. 5 is an enlarged section through a portion of the metering assembly of FIG. 3;
FIG. 6 is a cross section taken along lines 6—6 of FIG. 5;
FIG. 7 is a side elevation of the auger section of the metering assembly of FIG. 3 with the near side removed;
FIG. 8 is a vertical section through a canister constructed in accordance with the present invention;
FIG. 9 is a side elevation of the control motor assembly as shown in dash-line in FIG. 2;
FIG. 10 is an end view of the control motor assembly of FIG. 9;
FIG. 11A is a section taken along lines 11A—11A of FIG. 9, while
FIG. 11B is a similar section taken along lines 11B—11B.
FIG. 12 is a block diagram of the control circuitry of the invention;
and
FIG. 13 is a schematic illustration of an alternative form of liquid supply.

DESCRIPTION OF THE PREFERRED EMBODIMENT

Figure 1:
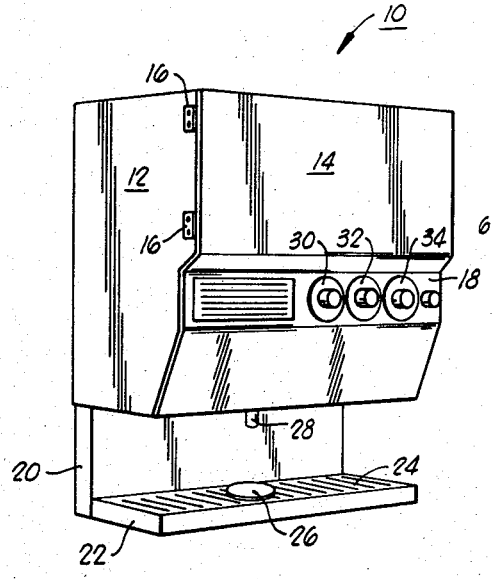
FIG. 1 is a perspective view of the dispensing machine constructed in accordance with the invention.

As shown in FIG. 1, a dispensing machine 10 consists of a housing 12 having a front panel 14 mounted thereon by means of hinges 16. The front panel 14 is optimally shaped to provide an access portion 18 which provides positioning for various front panel controls as will be further described below.

The housing 12 is supported in an upright position by means of a support member 20 which is formed to have a foot portion 22 securely affixed thereto. The foot portion 22 is adapted to receive a suitable form of grill member 24 which serves to support a container pedestal 26 beneath a pour spout 28. The grill 24 allows waste liquid material to pass therebeneath such that it maintains the container pedestal 26 reasonably clean at all times. If desired, the installation can include drainage means for connection at a lowermost point of the interior of foot member 22.

Figure 2:
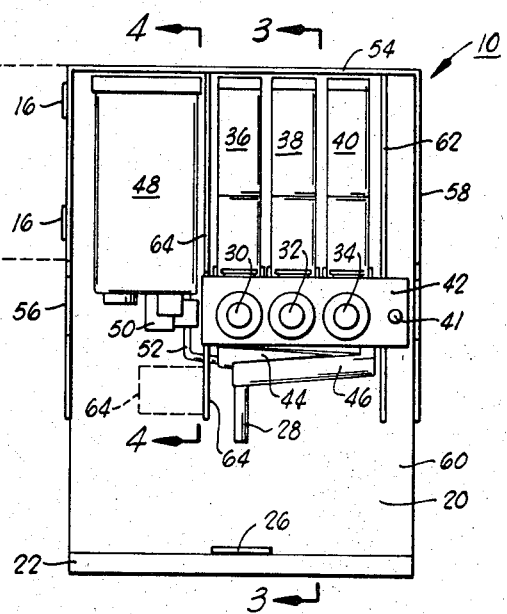
FIG. 2 is an elevation of the front of the dispensing machine of FIG. 1 with the front panel removed.

Referring also to FIG. 2, front panel selection of powdered food ingredients is made by manipulation of one or more of knobs 30, 32, and 34. In the preferred form, these powdered food materials would be dehydrated coffee, powdered cream substitute, and granulated sugar respectively. It is also contemplated to employ the recently marketed freeze-dried type of powdered coffee concentrate. While specific reference is made to coffee and related ingredients in the following disclosure it should be understood that many other types of powdered concentrates may be utilized for mixture with a selected liquid. Thus, a quantity of dehydrated coffee, powdered cream substitute and sugar is contained, for example, in each of the respective canisters 36, 38 and 40. Actually it is contemplated that four and five such canisters will be used in some cases. Canisters 36, 38 and 40 are of unitary design and each is slidable into or out of the dispensing machine 10 in operative engagement to supply their respective materials to a metering assembly 42. A pushbutton switch 41 serves to initiate the dispensing operation as will be further described.

Materials dispensed by metering assembly 42 are placed in a first mixing portion 44 of a trough 46 which terminates at pour spout 28. A selected liquid, e.g. hot water, is stored in a tank 48 mounted within housing 12 and predetermined amounts are periodically released by means of a solenoid valve 50 through a tube 52 into the mixing portion 44 of trough 46. A direct liquid supply may be utilized in place of tank 48 as will be further described below.

It is contemplated that the entire dispensing machine can be fabricated from known plastic materials. This includes the frame structure or housing 12 which is constructed with a top panel 54, continuous left and right side panels 56 and 58 and rear panel 60 which also forms an integral part of the support member 20. A pair of longitudinal frames 62 and 64 are vertically mounted within housing 12 to provide structural strength, i.e. they provide rigidity for housing 12 as well as properly spaced mounting panels for such as metering assembly 42 and related components. A control motor assembly to be further described below may be mounted at the lower end of frame panel 64 in the area shown by dash-lines 66. It is also contemplated that certain installations will carry out a vending function and well-known, commercially available coin acceptance mechanism 67 (dash-lines) can be mounted on housing 14 with necessary interconnection provided for initiating operation. A suitable form of coin mechanism is available from Coin Rejectors, Inc. of St. Louis, Mo.

Figure 3:
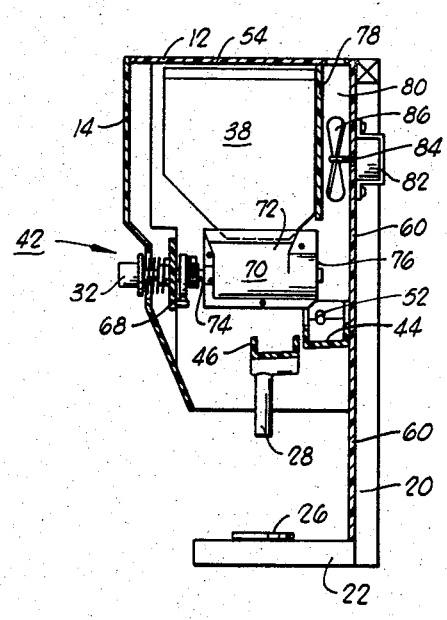
FIG. 3 is a vertical section taken along lines 3—3 of FIG. 2.

Referring also to FIG. 3, the interior workings of metering assembly 42 consists of a rachet-drive assembly 68 which is actuated to control an augering cylinder 70. The augering cylinder 70 is maintained below a respective canister 36–40, in this canister 38, so that supply material is continually present for feeding into the hopper portion 72 of augering cylinder 70. Rotation of knob 32 and, therefore, auger shaft 74 will then cause a measured amount of whatever the powdered food material to be forced out the upper end portion of augering cylinder 70 whereupon it falls into mixing portion 44 of trough 46.

The metering assembly 42 provides a rachet-drive assembly 68 and augering cylinder 70 in operative relationship beneath each of the canisters 36, 38, and 40 and these are each controlled by front panel knobs 30, 32, and 34 respectively. A transverse hanger panel 78 is provided across the top of upper panel 54 to define a chimney space 80 across the rear, upper side of housing 12. This provides an air circulation duct such that the interior air can be continuously circulated to guard against collections of high humidity air. A motor 82 may be mounted on rear panel 60 to provide continuous rotation via shaft 84 to a suitable fan blade 86. Any of various well-known types of commercially available motor such as the Dayton Electric Model 4C0 may be employed.

Figure 4:
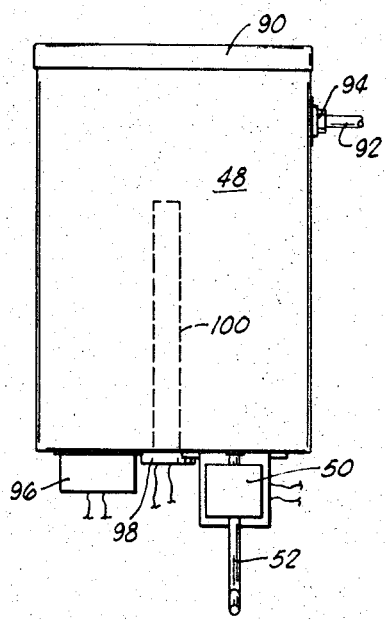
FIG. 4 is a vertical section taken along lines 4—4 of FIG. 2.

The section of FIG. 4 shows the liquid tank 48 to better advantage. Thus the tank 48 is merely a rectangular container having a sealable top 90 placed thereover. Liquid input from a suitable nearby supply is effected by means of a tube 92 sealingly connected through a coupling 94. A standard type of commercially available solenoid valve 50 controls outlet of liquid from container 48 through outlet tube 52. Also included in tank 48 are a well-known form of thermostatic switch 96 mounted on the underside of tank 48 to sense the temperature of liquids therein, and a commercially available form of heater element 98 which is sealingly connected to the bottom of tank 48 to extend the electrically controlled heater surface 100 upward therein.

The enlarged view of FIG. 5 illustrates the ratchet-drive assembly 68 of metering assembly 42 (FIG. 3) to better advantage. Thus, referring to knob 32 for example, the access portion 18 of front panel 14 is formed with a boss 102 for receiving one end of a return spring 104 and a bore 106 for receiving actuating shaft 108 therethrough. The other end of spring 104 is locked or securely held as by press fitting in a boss 110 formed in the backside of knob 32. The knob 32 is rigidly connected to rotate input shaft 112 which is secured to transmit input rotation to shaft 108 and a larger diameter pawl wheel 114 carrying a ratchet pawl 116 as held by post 118. Referring also to FIG. 6, the pawl 116 is maintained in engagement with a rachet gear 120 which functions to provide periodic, unidirectional rotation to auger shaft 74. The auger gear 120 is formed with an integral, axial collar 122 which engages the end of auger shaft 74 in keyed relationship, e.g. in the preferred form a hexagonal fitting is employed. The other side of rachet gear 120 is formed with an axial post 124 which serves as a guide bearing internally within a similarly shaped bore 126 within input shaft 108. A stop 128 secured to the inner side of panel access portion 18 provides a zero limit in conjunction with a tab 130 formed on the outer circumference of pawl wheel 114.

As shown in FIG. 7, the augering cylinder 70 of metering assembly 42 (FIG. 3) consists of a paddle wheel-type auger 132 rotating within a cylinder sleeve portion 134 of augering cylinder 70. The augering cylinder 70 may be formed of plastic in two mating pieces. Thus, a left portion as shown in FIG. 7 consists of cylindrical portion 134 and hopper portion 72 with flanged portions 136, 138 and 139 prepared for mating engagement with similar parts of a right hand portion of reverse formation. Holes 140 are provided to receive suitable fasteners therethrough. The metering cylinder 70 includes a bore 142 through the outer end of cylinder portion 134 to receive auger shaft 74 rotationally therethrough. The opposite end of cylinder portion 134 has its lower side covered over by a semi-circularly formed panel 144 which includes an axially disposed insert 146 for rotationally receiving auger shaft 74. Measured powder material is then periodically pushed over panel 144 to fall away in the direction of arrow 148.

The paddle wheel auger 132 is a particular type selected for its ability to adapt to plastic formation techniques. Thus, auger shaft 74 includes a collar 150 formed integrally therewith to provide an end bearing surface while the opposed auger flights consist merely of plural, generally semi-circularly shaped plastic panels 152 which are each secured at a predetermined angle and spaced distance along auger shaft 74. Such a paddle wheel-type auger can be formed from various flat stock plastic forming techniques without the necessity for expensive plastic molds.

FIG. 8 illustrates a canister, for example canister 38 (FIG. 3), for containing the various powdered food materials. The canister 38 is formed with its various walls optimally shaped for inclusion in the dispensing machine 10. Thus, lower wall portions 154 and 156 are shaped at an angle to provide proper flow of powdered material out through bottom 158. Powdered materials can be stored and carried in canister 38 as it is closed by slide door 160 sealingly connected across bottom 158 as retained between an inner bead 162 and an outer bead 164 disposed along each side of bottom 158. It may even be desirable in some cases to seal slide gate 160 in closed position for purposes of public sale of filled canisters or such. Upon placing canister 38 in a dispensing machine 10 in proper position over a hopper 72 of a metering cylinder 70, the slide gate 160 can be pulled out to allow flow of the powdered material downward into contact with auger 132 for metering disposition. It is also contemplated to include a see-through window panel of transparent plastic such as at section 165 of the canisters.

FIGS. 9 and 10 illustrate a control motor assembly 170 which may be employed to actuate the dispensing machine 10. The control motor assembly 170 may be mounted from hanger panel 64 in the space designated by dash line 66 of FIG. 2. Thus, control motor assembly 170 consists of a gear motor 172, motor 174 and integral gear box 176 of commercially available type. Rotational output from gear box 176 is provided via a shaft 178 and this rotational speed should be selected to be compatible with water tube 52 and the applicable pressure to dispense a desired or proper amount of water or liquid. Other factors contributing to this control are cams 180 and 182 disposed along output shaft 178 to continually contact respective rollers 184 and 186 of micro-switches 188 and 190. The cam relationships are further shown to good advantage in sectional FIGS. 11A and 11B, each being shown in its normally open "off" position.

The extreme end of rotational output shaft 178 is terminated in a cam 192 carrying a post 194 for connection to an actuating spring 196. The actuating spring 196 is employed to actuate a lever 198 of a known type of mechanical counter 200. With the dispensing of each cup of food material, cam wheel 192 makes one revolution to actuate lever 198 to register a single count in mechanical counter 200. The mechanical counter 200 may be mounted in any suitable manner so long as its actuating relationship is maintained, e.g. it may be mounted to the lower, inner side of left side panel 56.

Electrical energization of dispensing machine 10 is carried out by control circuitry 202. Control circuitry 202 receives A-C line input via leads 204 and 206 to provide energization of each of several parallel-connected components. Thus, fan motor 82 is connected between leads 204 and 206 for continuous energization while heater 98 and thermostat 96 are series-connected to provide intermittent heating in response to thermostatic control. The solenoid valve 50 which dispenses hot water or other reservoir liquid from tank 48 is controlled by micro-switch No. 2, 190 (FIG. 11A) such that liquid flow is also metered in accordance with drive motor revolutions present on output shaft 178. The drive motor 174 is initially energized by actuation of pushbutton switch 41 to place A-C voltage on a by-pass lead 208, and after rotation begins microswitch No. 188 is closed to provide holding contact for the remainder of the operating period. A heater 210 is employed when direct water input is employed (as will be described) and control relay 212 provides an input for controlling pushbutton switch 41 or an equivalent in response to initiation input from a coin acceptance mechanism (not shown).

OPERATION

The dispensing machine 10 may be prepared for particular usage at a specified site. By way of example then, it may be placed at an office or small manufacturing concern for the purpose of coffee dispensing. The canisters 36, 38, and 40 containing freeze-dried coffee, powdered cream substitute and sugar, respectively, would be placed in the dispensing machine 10 in filled condition and with each of their slide gates 160 removed. Water input from a nearby supply is applied via tube 92 into the tank 48, and the thermostat 96 and heater element 98 function to maintain the water supply at a desired temperature.

The customer or user can then select the strength of each of the coffee, cream, etc. materials from canisters 36, 38 and 40 by rotating their respective control knobs 30, 32 and 34 through only a selected circular traverse. The amount of circular traverse of the knobs, e.g. control knob 32, controls the amount of rotation of auger shaft 74 and therefore auger 132 to displace a precise amount of the powdered material out of the end of cylinder 134 in the direction of arrow 148 (see FIG. 7). The access panel portion 18 is preferably marked with rotational graduation showing the strength of coffee or whatever which can be dialed. Thus, in the case for dehydrated coffee, knob 30 may be rotated through 90° for a weak cup, through 120° for a medium cup, and through 150° for a strong cup. The similar variable selection mechanism is afforded the remaining knobs 32 and 34.

FIG. 5 shows the rachet-drive assembly which allows such selection. The knob 32 can be turned in a clockwise directioin to turn pawl wheel 144 and pawl 116 and these, in turn, force rachet gear 120 clockwise to turn auger shaft 74 in the same direction by whatever the dialed degree. Then, after selection of the desired strength, knob 32 is released and forced back to its zero or start setting by spring 104 while pawl wheel 114 returns to a new start setting without returning rachet gear 120. Thus, the auger shaft 74 is intermittently rotated in only the clockwise directioin such that the auger 132 does not back up to cause a void in the supply of powdered material disposed in augering cylinder 70.

The user may thus dial each of knob 30, 32, and 34 to measure the desired amount of coffee, cream and sugar, whereupon he then depresses push button 41 to initiate the dispensing operation. Actuation of push button switch 41 starts drive motor 174 to turn its output shaft 178 such that respective cams 180 and 182 close their micro-switches 188 and 190 to maintain dispensing function through a preset rotation of shaft 178. Thus, micro-switch 188 serves to hold drive motor 178 energized until it makes a complete revolution, while micro-switch 190 energizes solenoid valve 50 to dispense hot water through tube 52 into the mixing section 44 of trough 46, it also being released after a preset portion of a revolution.

FIG. 13 shows an alternative form of water or liquid supply which may be employed, this form effecting further space saving of components. Thus, the same solenoid valve 50 may be used to control water input from source conduit 92 to a heating tube coil 214 which is preferably formed from a heat-conductive metal, e.g. copper. A wire heater 216 connected between inputs 218 and 220 (see also FIG. 12) is closely wrapped in insulated placement about tube coil 214 to provide very rapid heating of water coursing therethrough. For example, it may be desirable to release seven ounces of heated water from the tube coil 214 and, with proper selection of components, the device of FIG. 13 will function to heat and release for mixing only that amount of liquid. Suitable forms of asbestos insulated Nichrome heater wire are commercially available for use as heater 216.

It is contemplated that various food materials other than coffee and related materials may be employed in the dispensing canisters. Instant tea, various soap mixes and other forms of dehydrated food materials may be employed wtih hot or cold water or still other selected liquids for addition thereto.

The foregoing discloses a novel dispensing machine which is easily maintained in a condition of maximum sanitation under the circumstances, and which may be constructed from light, inexpensive materials as a rugged, attractive dispensing machine. The invention embodies the idea of prepackaging certain powdered or dehydrated food commodities for unitary handling and easy installation in the dispensing machine for the purpose of reconstitution as a desirable food product. Further, the machine is designed along modular lines so that various numbers of canisters and related metering assemblies may be included in a structure, this depending upon its intended function.

Changes may be made in the combination and arrangement of elements as heretofore set forth in this specification and shown in the drawings; it being understood that changes may be made in the embodiments disclosed without departing from the spirit and scope of the invention.

What is claimed is:

1. Apparatus for dispensing reconstituted dried food into a container comprising:
   housing means of generally cubical form and including a front access panel;
   support means secured beneath said housing means to provide a container receiving area;
   supply means secured within said housing means for holding a liquid;
   trough means secured within said housing means adjacent said supply means and terminating at said container receiving area;
   removable canister means containing powdered food material;
   metering means secured in said housing means and including a hopper portion in connection to receive food material from the removable canister means, said hopper portion communicating with a cylinder portion having an open end disposed adjacent said trough means;
   auger means disposed rotatably within said cylinder portion;
   adjustment means disposed through said front access panel for rotating said auger means a predetermined amount to displace only a selected amount of food material into said trough means; and
   control means actuatable to release a selected amount of liquid from said supply means into said trough means for mixture with said food material and disposition in said container means.

2. Apparatus as set forth in claim 1 which is further characterized to include:
   a plurality of said removable canister means each disposed in operative relationship to an equal number of metering means secured in said housing means.

3. Apparatus as set forth in claim 2 which is further characterized in that there are three removable canister means and their respective metering means, one for each of a dry coffee concentrate, a dry cream material and sugar.

4. Apparatus as set forth in claim 1 wherein said control means comprises:
   drive motor means providing rotational output to each of a first and second cam means;
   solenoid valve means for releasing liquid from said supply means into said trough means;
   first microswitch means connected to be actuated by revolution of said first cam means to energize said drive motor means;
   second microswitch means disposed to be actuated by revolution of said second cam means to energize said solenoid valve means to release a selected amount of liquid.

5. Apparatus as set forth in claim 2 wherein said control means comprises:
   drive motor means providing rotational output to each of a first and second cam means;
   solenoid valve means for releasing liquid from said supply means into said trough means;
   first microswitch means connected to be actuated by revolution of said first cam means to energize said drive motor means;
   second microswitch means disposed to be actuated by revolution of said second cam means to energize said solenoid valve means to release a selected amount of liquid.

6. Apparatus as set forth in claim 1 wherein said supply means comprises:
   liquid container means secured in said housing means and having an inlet opening and an outlet opening which leads to said trough means;
   heater means sealingly connected through said liquid container means to project a heating surface into contact with said liquid;
   thermostat means sealingly connected through said liquid container means in contact with said liquid to control energization of said heater means to maintain said liquid at a predetermined temperature.

7. Apparatus as set forth in claim 2 wherein said supply means comprises:
   liquid container means secured in said housing means and having an inlet opening and an outlet opening which leads to said trough means;
   heater means sealingly connected through said liquid container means to project a heating surface into contact with said liquid;
   thermostat means sealingly connected through said liquid container means in contact with said liquid to control energization of said heater means to maintain said liquid at a predetermined temperature.

8. Apparatus as set forth in claim 3 wherein said control means comprises:
   drive motor means providing rotational output to each of a first and second cam means;
   solenoid valve means for releasing hot water from said tank means into said trough means;
   first microswitch means connected to be actuated by revolution of said first cam means to energize said drive motor means;
   second microswitch means disposed to be actuated by revolution of said second cam means to energize said solenoid valve means to release a selected amount of liquid.

9. Apparatus as set forth in claim 1 wherein said supply means comprises:
   tube means for connection to an external source of said liquid; and
   heater means disposed adjacent said tube means and energizable to heat liquid passing therethrough.

10. Apparatus as set forth in claim 2 wherein said supply means comprises:
    tube means for connection to an external source of said liquid; and
    heater means disposed adjacent said tube means and energizable to heat liquid passing therethrough.

11. Apparatus as set forth in claim 1 which is further characterized to include:
    counter means mounted in said housing means and connected to be actuated one count upon each actuation of said control means.

12. Apparatus as set forth in claim 2 which is further characterized to include:
    counter means mounted in said housing means and connected to be actuated one count upon each actuation of said control means.

13. Apparatus as set forth in claim 2 which is further characterized to include:
    coin acceptance means connected to provide an initiation output; and
    means receiving said initiation output and energizable to actuate said control means.

References Cited

UNITED STATES PATENTS

| | | | |
|---|---|---|---|
| 2,832,510 | 4/1958 | Hill | 222—144.5 X |
| 3,034,685 | 5/1962 | Breitenstein | 222—144.5 X |

STANLEY TOLLBERG, Primary Examiner

U.S. Cl. X.R.

222—2, 129.4, 146